Patented Oct. 22, 1929

1,733,057

UNITED STATES PATENT OFFICE

FRIEDRICH FELIX AND OTTO ALLEMANN, OF BASEL, SWITZERLAND, ASSIGNORS TO SOCIETY OF CHEMICAL INDUSTRY IN BASLE, OF BASEL, SWITZERLAND, A FIRM

DYESTUFF PREPARATION AND PROCESS OF MAKING SAME

No Drawing. Application filed May 28, 1927, Serial No. 195,136, and in Switzerland May 29, 1926.

The present invention relates to dyestuff preparations which will render valuable services in the dyeing of textile goods. It comprises the new preparations, the method of producing same, and the material dyed with the new products.

It has been found that the products, which are obtained by treating with sulfonating agents the resinous residues which are obtained as by-products at the rectification of benzaldehyde have the surprising property that they greatly facilitate the production of dyestuff preparations in which the dyestuff must be present in a finely dispersed form.

These dyestuff preparations are made by treatment of dyestuff pastes or suspensions, respectively, with the said aids. If the dyestuff particles be already present in the dyestuff pastes or suspensions in a sufficiently fine form, the addition of a small quantity of the aid will suffice to remove the cohesion forces which drive the single dyestuff particles to agglomerate to greater and still greater conglomerates. In this way the dyestuff pastes will be prevented from stiffening and the dyestuff emulsions from settling down. This constitutes a considerable technical advance. If the dyestuff particles of the pastes or suspensions are coarse-grained or even coarsely crystalline, they are triturated in a suitable mill with the aid. There are thus obtained in a short time stable emulsions or pastes, respectively, in which the solid dyestuff particles are now present in a colloidal suspension or they may be dissolved.

The new dyestuff preparations are useful for a variety of purposes. For instance, if an azo-dyestuff, an indophenol or an anthraquinone derivative, any of which has an affinity for acetate silk, is rubbed with a solution of one of the new sulphonation products an emulsion is produced which dyes acetate silk or cellulose ester fast tints without an addition of soap. If vat dyestuffs are thus treated thinly liquid pastes are obtained which possess the great advantage that they do not or only exceedingly slowly separate into the component parts.

For the purposes above mentioned there will suffice as a rule small quantities of the new aids, for example 1 to 5 per cent of the dry dyestuff.

These preparations may also be converted into solid products, which disintegrate in the presence of water with formation of fine emulsions of dyestuff, by drying them, preferably in a vacuum and at temperatures which are not too high (e. g. 80° to 120° C.). It is preferable to use in this case considerably more of the aid, that is up to a quantity equal to that of the dyestuff. One may then replace a part of the new sulfonation product by other products, such as molasses or sulfite cellulose waste liquor. The possibility of making such solid preparations is of particular value not only for dyestuffs suitable for acetate silk but for vat-dyestuffs.

The following examples illustrate the invention, the parts being by weight:—

*Example 1*

15 parts of the dyestuff from diazotized paranitraniline and cresidine of the formula

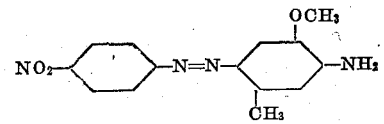

in the form of a press cake of 30 per cent strength are stirred with 25 parts of a solution of 50 per cent strength of the sulfonation product obtained by sulfonating the resinous residues which are obtained at the rectification of benzaldehyde as by-products (cf. the copending application Serial No. 193,738 filed May 23, 1927) until a sample gives a completely homogeneous emulsion in water. There is thus obtained a fluid paste which is thoroughly well suited for making, for instance, a dye-bath for acetate silk. Similar pastes are produced when a pyrazolone-azo-dyestuff, an anthraquinone derivative or an indophenol is substituted for the aminoazo-dyestuff.

*Example 2*

10 parts of the azo-dyestuff from diazobenzine and 1-phenyl-3-methyl-5-pyrazolone of the formula

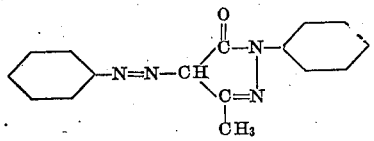

in form of a press-cake of 50 per cent strength, are first stirred in a ball-mill with 0.2 part of a solution of 50 per cent strength of the sulfonation product of the resinous residue obtained as by-product at the rectification of benzaldehyde, and 5 parts of water, until a homogeneous emulsion is obtained. This emulsion is a very stable preparation which is excellently suitable for the dyeing of acetate silk.

If the pasty preparation is to be converted into a dry powder, it will be of advantage to mix the same with 30 parts of a 50 per cent solution of sulfite cellulose waste liquor, then stirring the mass until it is fully mixed, and finally drying the same, preferably in a vacuum. There is thus obtained a yellow powder which, when finely ground, will disperse in water with equal ease as the paste started from.

Analogous results are obtained with aminoazo-dyestuffs and indophenols.

*Example 3*

A paste of 30 parts of the dyestuff from diazotized para-nitraniline and cresidine of the formula

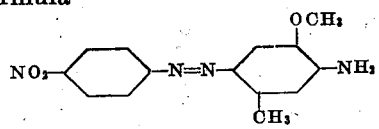

in the form of a press cake of 30 per cent strength, is mixed with 200 parts of a solution of 50 per cent strength of the product made in accordance with Example 1, and the mixture is dried in a vacuum and subsequently powdered. The dry product yields with water emulsions which have the same properties as those obtainable from the pastes.

*Example 4*

10 parts 1-amino-4-hydroxyanthraquinone of the formula

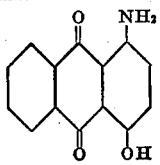

in form of a dyestuff paste of 20 per cent strength are first rubbed with 0.5 part of the sulfonated resinous residue which is obtained at the rectification of benzaldehyde as a by-product. To this mass which has become thinner there are introduced 29 parts of sulfite cellulose liquor of 50 per cent strength. The mass is then stirred until a homogeneous mixture is obtained, followed by drying the same, preferably in a vacuum. There is thus obtained a redbrown powder which spreads in water with formation of a blue-red suspension. From this suspension acetate silk is dyed in blue-red tints.

Similarly there may also be treated aminoanthraquinone, aminobenzanthrone, 1:4-diaminoanthraquinone, 1:4:5:8-tetraaminoanthraquinone, and the like.

*Example 5*

400 parts of a press-cake of flavanthrene of the formula

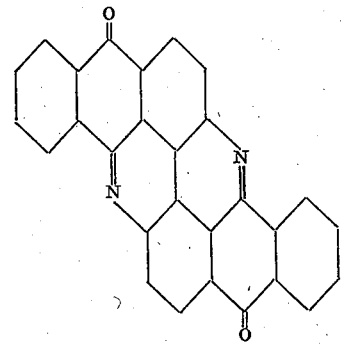

of 18 per cent strength are stirred with 4 parts of the sodium salt of the sulfonation product mentioned in Example 1, whereby the paste becomes more fluid. The product passes into a vat immediately in presence of an alkaline sodium hydrosulfite solution and the vat dyes cotton fast yellow tints.

By drying this suspension, preferably, as mentioned in the preceding example, with addition of sulfite cellulose waste liquor, there is obtained a solid preparation which can easily be powdered and disintegrates in presence of water immediately into a homogeneous finely dispersed emulsion. The powder is particularly useful in cotton printing, since when made into a paste with water the paste can be mixed with the printing colour which is of great advantage for the printing process using hydrosulfite formaldehyde.

Similar results are obtained with the other vat dyestuffs of the anthraquinone series, such as 1:2:1':2'-dihydroanthraquinone azine and the halogen substitution products thereof, pyranthrone and the like, and the known indigoid dyestuffs.

What we claim is:—

1. As a step in the manufacture of dyestuff preparations the treatment of mixtures of difficultly soluble dyestuffs and water with the sulfonation product of the resinous residue which is obtained as by-product at the rectification of benzaldehyde.

2. As a step in the manufacture of dyestuff preparations the treatment of mixtures of difficultly soluble dyestuffs which have affinity to the acetyl cellulose, and water, with the sulfonation product of the resinous residue which is obtained as by-product at the rectification of benzaldehyde.

3. As steps in the manufacture of dyestuff preparations the treatment of mixtures of difficultly soluble dyestuffs and water with the sulfonation product of the resinous residue which is obtained as by-product at the rectification of benzaldehyde, followed by drying the pastes thus obtained.

4. As steps in the manufacture of dyestuff preparations the treatment of mixtures of difficultly soluble dyestuffs and water with the sulfonation product of the resinous residue which is obtained as by-product at the rectification of benzaldehyde, followed by drying the pastes thus obtained in presence of sulfite cellulose waste liquor.

5. As steps in the manufacture of dyestuff preparations the treatment of mixtures of difficulty soluble dyestuffs which have affinity to acetyl cellulose, and water, with the sulfonation product of the resinous residue which is obtained as by-product at the rectification of benzaldehyde, followed by drying the pastes thus obtained in presence of sulfite cellulose waste liquor.

6. As new products the preparations produced according to claim 1, consisting of emulsions of difficultly soluble dyestuffs, water, and the sulfonation product of the resinous residue which is obtained as by-product at the rectification of benzaldehyde.

7. As new products the preparations produced according to claim 2, consisting of emulsions of difficultly soluble dyestuffs which have affinity to acetyl cellulose, water, and the sulfonation product of the resinous residue which is obtained as by-product at the rectification of benzaldehyde.

8. As new products the dry preparations produced according to claim 3, which form powders consisting of difficultly soluble dyestuffs and the sulfonation product of the resinous residue which is obtained as by-product at the rectification of benzaldehyde, and which disintegrate in water with formation of finely dispersed emulsions.

9. As new products the dry preparations produced according to claim 4, which form powders consisting of difficultly soluble dyestuffs, the sulfonation product of the resinous residue which is obtained as by-product at the rectification of benzaldehyde, and sulfite cellulose waste liquor, and which disintegrate in water with formation of finely dispersed emulsions.

10. As new products the dry preparations produced according to claim 5, which form powders consisting of difficultly soluble dyestuffs having affinity to acetyl cellulose, the sulfonation product of the resinous residue which is obtained as by-product at the rectification of benzaldehyde, and sulfite cellulose waste liquor, and which disintegrate in water with formation of finely dispersed emulsions.

In witness whereof we have hereunto signed our names this 14th day of May, 1927.

FRIEDRICH FELIX.
OTTO ALLEMANN.